Oct. 25, 1966 G. W. FYLER 3,281,531

GAMMA DISTORTION CORRECTION CIRCUIT

Filed June 11, 1963

INVENTOR.
George W. Fyler
BY John J. Pederson
Atty.

United States Patent Office 3,281,531

Patented Oct. 25, 1966

3,281,531

GAMMA DISTORTION CORRECTION CIRCUIT

George W. Fyler, Lombard, Ill., assignor to Zenith Radio Corporation, Chicago, Ill., a corporation of Delaware Filed June 11, 1963, Ser. No. 287,008
3 Claims. (Cl. 178—7.5)

Figures 1, 2:
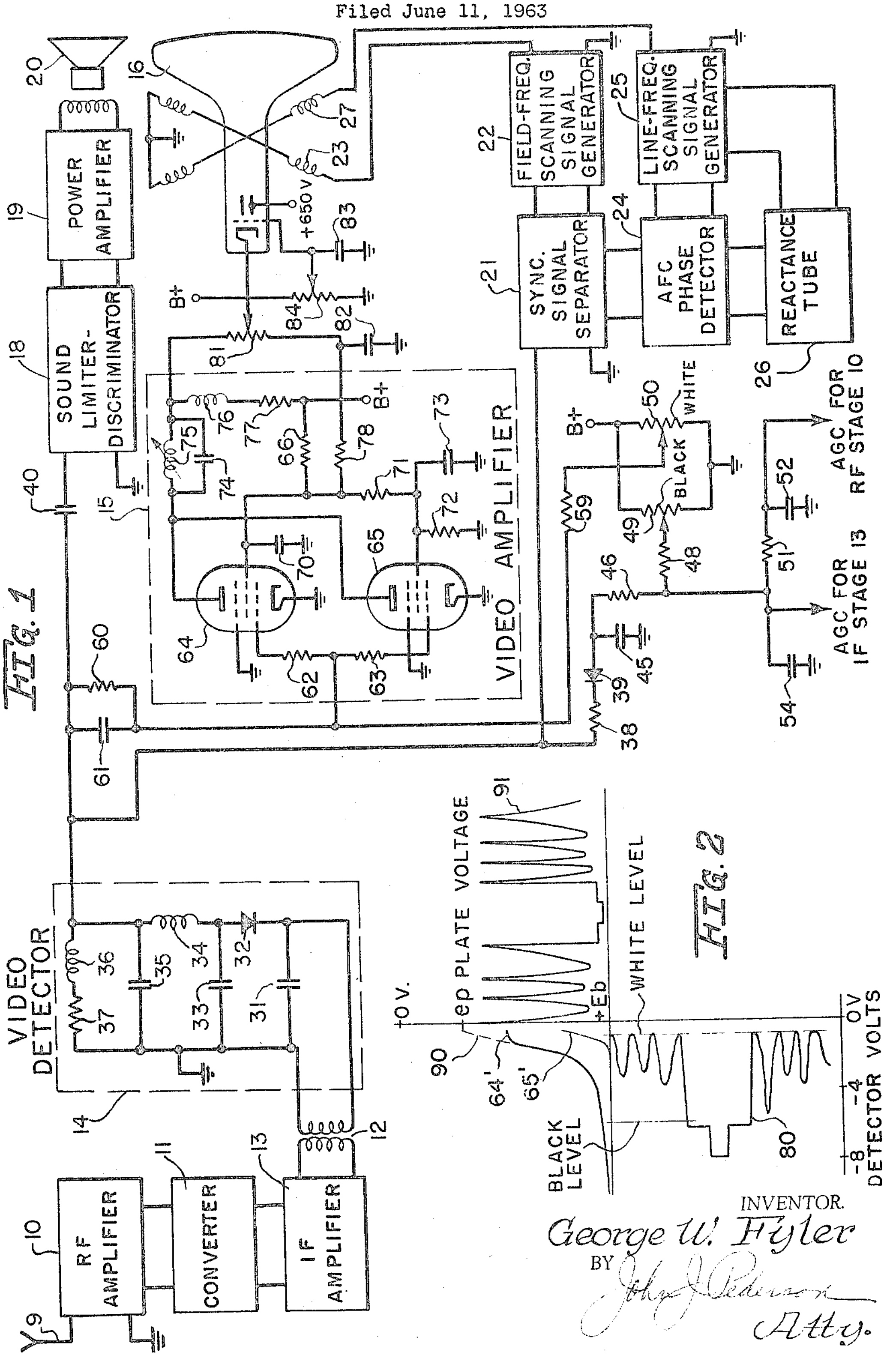

This invention relates generally to television receivers. More specifically, it relates to a gamma correction circuit for use in a television receiver.

The term gamma may generally be defined as a numerical indication of the degree of contrast in a television or photographic image. Specifically, gamma is defined as the coefficient expressing the evaluation of the slope at a point on a curve of a log-versus-log plot relating input and output brightness and/or output signal magnitudes of the monochrome channel, or a part thereof. For optimum reception, the overall gamma of the system should be constant throughout the video modulation range. Gamma distortion in television receivers such as black region compression and limiting and white region compression and limiting is attributable to non-uniformity of the signal transfer characteristic of the receiver circuitry and/or image reproducer. Normally, the radio-frequency or intermediate-frequency stages of the receiver are not overloaded and most of the gamma distortion effects occur after the second detector.

It is generally known that in a complete television system there are a multitude of photographic and electrical transfers required. Due to the number of transfers required, gamma distortion appears to be quite prevalent in most systems. Consequently, a definite value for gamma has little significance. While the Federal Communication Commission has stated at section 3.682, paragraph 18 of the FCC Rules and Regulations, September 1961, that for monochrome transmission the transmitter output shall vary in substantially inverse logarithmic relation to the brightness of the subject, it appears that most networks attempt to complement the raster brightness curve of the picture tube rather than to follow the pertinent FCC rule. The raster brightness curve as obtained with a light meter has been found not to accurately represent the brightness characteristic as seen by the eye. Even if logarithmic transmission were used by the station, a non-complementary transfer characteristic would be required for producing a good picture because of the additional exponential curvature needed to allow for spot size growth and other factors in the receiver.

A more complete discussion of gamma distortion effects in television receivers can be found in an article entitled "Gamma Distortion In The Monochrome TV System" by G. W. Fyler, p. 21, IRE Transactions on Broadcast and Television Receivers, July 1962, volume BTR–8, Number 2.

It is therefore, a general object of the invention to provide a new and improved circuit for a television receiver to overcome the aforenoted deficiencies and disadvantages of prior circuits.

It is another object of this invention to provide a new and improved video amplifier network for a television receiver.

It is still a further object of this invention to provide a new gamma correction circuit for use in a television receiver to provide reproduced images of improved quality.

It is still another object of this invention to provide a new and improved single stage video amplifier network having gamma correction characteristics.

In accordance with the invention, a gamma correction circuit for use in a television receiver or the like is provided to compensate gamma distortion attributable to undesirable curvature of the signal transfer characteristic of a cathode-ray tube in the receiver. The circuit comprises means, including a video detector, for developing a detected video modulation signal and a first signal processing network, coupled to the developing means, operative on substantially all of the image components of the detected video modulation signal for developing a first non-linear video modulation output signal. The gamma correction circuit further comprises a second signal processing network, also coupled to the developing means, operative on only a predetermined portion of the detected video modulation signal for developing a second video modulation output signal, and means for applying the first and second output signals to the cathode-ray tube.

The features of this invention which are believed to be novel are set forth with particularity in the appended claims. The invention, together with further objects and advantages thereof, may best be understood, however, by reference to the following description taken in conjunction with the accompanying drawing, in the several figures of which like reference numerals identify like elements, and in which:

FIGURE 1 is an electrical schematic diagram of a television receiver embodying the gamma correction circuitry of the invention; and FIGURE 2 is a simplified graphical representation illustrating the operation of the circuit of FIGURE 1.

The receiver of FIGURE 1 comprises a signal receiving antenna 9 coupled to a radio-frequency amplifier 10 of one or more stages which includes means for selecting one of the transmitted signals. The selected signal is coupled from amplifier 10 to a converter 11 which provides an intermediate frequency signal. The output of the converter is translated to an intermediate-frequency amplifier 13 of one or more stages and there are means, including a video detector 14, for developing a detected video modulation signal coupled to IF amplifier 13 by an intermediate-frequency coupling transformer 12 to receive amplified intermediate-frequency signal. Coupled to the output of video detector is a video amplifier 15 which translates the detected video components to a cathode-ray tube or other image reproducing device 16. Detector 14 and video amplifier 15 will be explained more fully hereinafter. An intercarrier-sound signal component also derived by detector 14 is translated to sound limiter-discriminator 18 by way of a coupling capacitor 40. Limiter-discriminator 18 is coupled to an audio amplifier 19 having a speaker 20 coupled thereto in conventional fashion.

Video detector 14 is also provided with an output for translating detected field and line synchronizing signal components present in the intermediate-frequency signal. A synchronizing-signal-separator 21 is coupled to this output and provides information for synchronizing the scanning apparatus associated with an image reproducing device 16. A field-frequency scanning signal generator 22 is coupled to one output of sync-signal separator 21 and has a conventional field frequency scanning coil 23 coupled to its output terminals. A line-frequency signal translating network is also coupled to separator 21. It comprises a series arrangement of a phase detector 24, a reactance device 26 and a line scanning generator 25. An output is derived from generator 25 for use by phase detector 24 to provide an error signal to vary the reactance of device 26. A conventional line frequency deflection coil 27 is coupled to generator 25.

Video detector 14 also supplies an output signal for developing an automatic gain (AGC) control signal for I–F stage 13 and R–F stage 10. Coupled to video detector 14 is the series arrangement of a decoupling resistor 38 and an AGC diode 39. A filter capacitor 45 is coupled between the anode of diode 39 and ground while a filter resistor 46 is coupled between the junction of the anode and capacitor 45 and a filter resistor 51. An AGC capacitor 54 is coupled between one end of resistor 51 and ground while the remaining end of resistor 51 is similarly coupled to ground through a filter capacitor 52. The AGC potential for R–F stage 10 is available at the junction of elements 51 and 52 and the AGC potential for stage 13 is provided at the junction of resistor 46 and capacitor 54.

The described receiver except for its video detector, AGC and video amplifier circuits is conventional. Incoming signals intercepted by antenna 9 are applied to radio-frequency amplifier 10. The selected signal is applied to converter 11 which heterodynes it with a locally generated oscillation to develop an intermediate-frequency signal which is amplified by amplifier 13. This amplified signal is applied to video detector 14 which derives the synchronizing, video and sound components. The video components are translated to video amplifier 15 which provides amplified video components for use by image reproducer 16. The sound components in the form of a 4.5 megacycle frequency-modulated intercarrier signal are applied to sound limiter-discriminator 18 which limits and translates the detected signal for application to amplifier 19. These amplified signals drive speaker 20 which reproduces the audio portion of the telecast.

The synchronizing signal components supplied by detector 14 are separated into field and line components, the field frequency components being translated to generator 22 which provides a deflection signal for the field or vertical yoke 23. The horizontal synchronizing output of separator 21 serves as a source of reference signal which is applied to phase detector 24. This detector compares the phase of the reference signal with the local signal of generator 25 to produce an error signal indicative of their phase relation. This error signal is applied to reactance device 26 which controls the frequency of line frequency generator 25 in conventional fashion. The horizontal deflection signal output of generator 25 is supplied to the horizontal yoke 27.

The automatic gain control potential developed by diode 39 is appropriately applied to stages 10 and 13 to vary their gain inversely to the magnitude of the detected signal in conventional fashion.

Referring more specifically to video detector 14, the intermediate-frequency signal which is translated by I–F output transformer 12 is impressed across a secondary tuning capacitor 31. A diode detector 32 is coupled to capacitor 31 and has a diode load capacitor 33 coupled between the anode of the diode and ground. The anode of diode 32 is also coupled to an I–F filter coil 34 which is in turn coupled to a filter capacitor 35. Coupled across filter capacitor 35 is a series arrangement of a compensating coil 36 and a load resistor 37 across which an output signal is derived.

The video amplifier 15 of the invention receives the output signal of detector 14 by way of a parallel R–C arrangement comprising a resistor 60 and a capacitor 61. Specifically, this signal is applied to a pair of resistors 62 and 63. Resistor 62 is coupled to the control grid of a vacuum tube 64 while resistor 63 is coupled to the control grid of a vacuum tube 65. Tube 64 is of the remote cut-off type and has its cathode coupled to ground. The screen grid of tube 64 is coupled to ground by way of a capacitor 70 and to a source of positive operating potential B+ by a resistor 66 while the suppressor is directly coupled to ground. The plate of tube 64 is coupled to potential source B+ by way of the series arrangement of a 4.5 megacycle trap network comprising a capacitor 74 and an inductor 75, a compensating inductor 76 and a plate load resistor 77.

Tube 65 has its cathode and suppressor electrodes grounded while its screen electrode is coupled to ground through the parallel combination of a resistor 72 and capacitor 73 and is also coupled to the screen grid of tube 64, and to B+ through resistor 66, by a resistor 71. The plate of tube 65 is coupled to the plate of tube 64 and derives its operating potential by way of elements 75, 76, and 77 as previously explained. The parallel combination of resistors 66, and 77, 78, 81 in series with resistors 71 and 72 serves as a voltage divider network from B+ to ground which determines the screen potentials and the peak plate currents of tubes 64 and 65.

Tube 64 and its related components serves as a first signal processing network, coupled to the video detector 14, operative on substantially all of the image components of the detected video modulation signal for developing a first nonlinear video modulation output signal for application to picture tube 16. Tube 65 and its related components serves as a second signal processing network, also coupled to video detector 14, operative on only a predetermined portion of the image components of the detected video modulation signal for developing a second video modulation output signal.

The amplified video modulation signal is supplied from the junction of trap 74, 75 and inductor 76 to a contrast control potentiometer 81 which is coupled to ground by a video by-pass capacitor 82. The wiper of potentiometer 81 is coupled to the cathode of picture tube 16 and video information is impressed thereon. Potentiometer 81 also serves as a means for applying the first and second output signals provided by tubes 64 and 65 to the cathode-ray tube 16. A resistor 78 is coupled between the junction of potentiometer 81 and capacitor 82 and the junction of resistors 66 and 71 to maintain uniform black level at any setting of potentiometer 81. The control grid of tube 16 is coupled to the wiper of a brightness potentiometer control 84 which is coupled between a source of positive potential B+ and ground. The wiper arm and picture tube grid are also bypassed to ground by a capacitor 83. A voltage of approximately +650 volts is supplied to the second grid electrode of the picture tube 16.

To provide adjustment of the peak white signal, a white level potentiometer 50 is coupled between a source of battery potential and ground. The arm of potentiometer 81 is coupled to network 60, 61 by a resistor 59. Resistors 59 and 60, capacitor 61 and potentiometer 50 determine the potential of the peak white signal applied to the video amplifier tubes by adding a positive potential developed on elements 60, 61 to the detected signal. Also coupled between the battery source and ground is a black level potentiometer 49 which has its wiper arm connected to a resistor 48. The remaining end of resistor 48 is coupled to the junctions of resistors 46 and 51.

In operation, the black level potentiometer 49 is adjusted to set the detected signal amplitude and therefore the black level of the detected signal. Adjustment of potentiometer 49 varies the video signal amplitude of the detector and, consequently, the black level by utilization and modification of the AGC voltage developed by diode 39. The potentiometer setting determines the voltage developed across the resistor 46 as it determines the magnitude of the current flowing from the potential source B+ to ground through the series arrangement of potentiometer 49 and resistor 48, 46, 38 and 37. Although there is a small charge in the developed AGC voltage with adjustment of the potentiometer setting, the developed AGC voltage remains substantially proportional to the developed detector voltage because the value of resistor 48 is large compared to that of resistor 46. AGC diode 39 functions as a semi-peak rectifier and rectifies the detected video signal. The signal rectification circuit includes diode 39 resistor 38 and filter capacitor 45. The rectification operation produces an AGC voltage on capacitor 45 representative of the black level of the detected signal and independent of the image components of the detected video signal. Adjustment of potentiometer 50 varies the magnitude of the positive voltage developed across resistor 60 resulting from the current flow from B+ through potentiometer 50 and resistors 59, 60 and 37 to ground, thus controlling the peak white potentials applied to the control grids of tubes 64, 65.

In accordance with the invention, tubes 64 and 65 have mutual transconductance curves such that the former operates as a remote cut-off video amplifier tube while the latter operates as a sharp cut-off video amplifier tube. As the tubes operate in parallel relationship, the resulting transfer characteristic of the video amplifier stage 14 is the sum of the characteristic curves of the two tubes as will be discussed subsequently. Tube 65 is biased so that it conducts only when white peaks of the detected video signal are presented to its grid. On the other hand, tube 64 amplifies substantially all of the image components.

As shown in FIGURE 2, line 64′ represents the voltage transfer characteristic of tube 64 while line 65′ represents the same characteristic of tube 65. A conventional video modulation envelope produced by detector 14 is represented by line 80 while the resulting video output signal applied to picture tube 16 is illustrated as line 91. As is characteristic of a negatively modulated video signal, the black level resides near the sync or information pulses while the white signal information is placed in the valley portions of the detected signal. Although the cathode-ray tube load presented to the video amplifier tubes is variable and causes the curve of tube 64 to curve sharply or limit near the white level, the resultant line 90, which is the sum of lines 64′ and 65′, represents the overall transfer characteristic of video stage 14, and compensates for the non-uniformity of the video load as well as the gamma distortion factors in the cathode-ray tube. Characteristic line 90 is of a configuration such at it supplements the transfer characteristic of the tube 16 so that their combination is substantially complementary to the transfer characteristic of the received television signal. As shown in FIGURE 2, curve 90 is approximately exponential in the area of interest and results in increased amplification of the highlight image or brightness components of the detected video signal when compared to the low brightness and pulse portions, for example, as illustrated by curve 91. As another feature of the invention, the gamma corrected picture has less apparent thermal or visible noise because incorporation of the gamma correction circuit of the invention results in a reduction of the gamma in areas of low brightness. Furthermore, the average picture tube beam current is reduced, which results in a higher applied voltage and effectively higher peak brightness in the reproduced picture. This is achieved with the use of the exponential video voltage transfer curve 90 shown in FIGURE 2. When an exponential transfer curve is employed in the video amplifier in lieu of a linear transfer curve, the peak to peak video voltage applied to picture tube 16 remains the same but the intermediate voltage points between the peak values are reduced. Thus, as the magnitude of the video voltage applied to the tube is reduced at all values between the white peak and black peak voltages, the average beam current is also reduced, resulting in a corresponding reduction in the load on the high voltage power supply. With the circuit of the invention, a substantially linear over-all transfer characteristic is obtained throughout a 1000 to 1 ratio of raster brightness when displayed on a graph having the detected video signal plotted linearly and the raster brightness plotted logarithmically.

Merely by way of illustration and in no sense by way of limitation, the following circuit component values may be employed in the embodiment of FIGURE 1:

| | | |
|---|---|---|
| Resistors: | | |
| **37** | kilohms | 2.7 |
| **38** | do | 22 |
| **46** | do | 330 |
| **48** | megohms | 15 |
| **51** | do | 1.5 |
| **59** | do | 15 |
| **60** | kilohms | 100 |
| **62** | ohms | 330 |
| **63** | do | 330 |
| **66** | kilohms | 47 |
| **71** | do | 18 |
| **72** | do | 16 |
| **77** | ohms | 3300 |
| **78** | kilohms | 3.9 |
| Potentiometers: | | |
| **49** | megohm | 1 |
| **50** | do | 1 |
| **81** | kilohms | 30 |
| **84** | megohm | 1 |
| Capacitors: | | |
| **45** | microfarads | .1 |
| **52** | do | .1 |
| **53** | do | .1 |
| **61** | do | .1 |
| **70** | do | 5 |
| **73** | do | 5 |
| **74** | micromicrofarads | 47 |
| **82** | microfarad | .01 |
| **83** | do | .01 |
| Diode **39** type | | 1N64 |
| Tubes: | | |
| **64** type | | 6BA6 |
| **65** type | | 6DK6 |

Although electron devices 64, 65 are represented as vacuum tubes, transistors or other similar devices may be employed in lieu thereof. Furthermore, although cathode-ray tube 16 is shown as cathode driven, the output signals of video amplifier tubes 64, 65 may be applied to the grid of tube 16 or the outputs of tubes 64, 65 may be separated and respectively applied to the grid and cathode of tube 16 with the appropriate signal phase reversals.

Thus the invention provides a new and improved circuit for a television receiver for producing an image of improved quality. The network of the invention provides a maximum of gamma correction available in a single stage video amplifier network.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

I claim:

1. A gamma correction circuit for use in a television receiver or the like to compensate gamma distortion in the reproduced image attributable to undesirable curvature of the signal transfer characteristic of a cathode-ray tube included in said receiver, said circuit comprising:

means, including a video detector, for developing a detected video modulation signal;

means coupled to said video detector, for adjusting the black level of said detected signal;

a first electron device having a predetermined non-linear signal transfer characteristic throughout an input signal range sufficiently broad to accept said entire detected video modulation signal;

a second electron device having a predetermined signal transfer characteristic throughout an input signal range substantially narrower than that of said first electron device and sufficiently broad to accept only a portion of said detected video modulation signal;

a signal translating stage, coupled to said video detector and to said cathode-ray tube, including said first and second electron devices and having a composite signal transfer characteristic of substantially exponential form;

and means, coupled to said signal translating stage, for adjusting the white level of said detected signal applied to said signal translating stage.

2. A gamma correction circuit for use in a television receiver or the like to compensate gamma distortion in the reproduced image attributable to undesirable curvature of the signal transfer characteristic of a cathode-ray tube included in said receiver, said circuit comprising:

circuit means for selecting a transmitted signal;

a signal translating network, coupled to said selecting means, for translating said selected signal;

means, including a video detector, for developing a detected video modulation signal;

an automatic gain control circuit, coupled to said detector, for controlling the gain of said signal translating network;

means, coupled to said automatic gain control circuit, for adjusting the black level of said detected signal;

a first electron device having a predetermined nonlinear signal transfer characteristic throughout an input signal range sufficiently broad to accept said entire detected video modulation signal;

a second electron device having a predetermined signal transfer characteristic throughout an input signal range substantially narrower than that of said first electron device and sufficiently broad to accept only a portion of said detected video modulation signal;

a signal translating stage, coupled to said video detector and to said cathode-ray tube, including said first and second electron devices and having a composite signal transfer characteristic of substantially exponential form;

and means, coupled to said signal translating stage, for adjusting the white level of said detected signal applied to said signal translating stage.

3. A gamma correction circuit as set forth in claim 2 wherein said portion of said detected video modulation signal accepted within the input signal range of the signal transfer characteristic of said second electron device includes said white level of said detected signal, and wherein said signal translating stage provides substantially greater amplification for said white level than for said black level.

References Cited by the Examiner

UNITED STATES PATENTS 2,796,518 6/1957 Schlesinger ------------ 178—6

FOREIGN PATENTS 174,962 5/1953 Austria.
584,436 8/1959 Canada.
1,143,540 2/1963 Germany.

DAVID G. REDINBAUGH, *Primary Examiner.*

A. J. McHUGH, *Assistant Examiner.*